(12) United States Patent
Kocher et al.

(10) Patent No.: US 6,248,380 B1
(45) Date of Patent: *Jun. 19, 2001

(54) PACKAGE HAVING A DUAL-FILM LID COMPRISING A GAS-IMPERMEABLE FILM AND A DELAMINATABLE, GAS-PERMEABLE FILM

(75) Inventors: Patrick N. Kocher, Greenville; H. Walker Stockley, Spartanburg, both of SC (US)

(73) Assignee: Cryovac, Inc., Duncan, SC (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/755,990

(22) Filed: Nov. 25, 1996

Related U.S. Application Data

(63) Continuation-in-part of application No. 08/471,065, filed on Jun. 6, 1995, now Pat. No. 5,686,126.

(51) Int. Cl.⁷ .............................. B65D 81/20; B65D 85/00
(52) U.S. Cl. ..................... 426/127; 426/396; 206/484; 428/43
(58) Field of Search ....................... 426/112, 122, 426/125, 126, 127, 129, 316, 652, 392, 396, 410, 415; 206/484.1; 229/123.25; 220/256, 257, 258; 53/449, 434

(56) References Cited

U.S. PATENT DOCUMENTS

| 1,042,119 | 10/1912 | Kavanagh . |
| 2,260,064 | 10/1941 | Stokes ........................................ 93/3 |

(List continued on next page.)

FOREIGN PATENT DOCUMENTS

| 2 240 234 | 8/1972 | (DE) . |
| 381234 | 3/1990 | (DE) . |

(List continued on next page.)

OTHER PUBLICATIONS

Brown, W.E., Plastics in Food Packaging, Marcel Dekker, Inc., 1992, pp. 227–32.*

Primary Examiner—Curtis E. Sherrer
(74) Attorney, Agent, or Firm—Thomas C. Lagaly

(57) ABSTRACT

A dual-film package and method for making such package is disclosed which combines the manufacturing simplicity of a package having a single, peelable lid with the consistent peelability of a package having separate permeable and impermeable lids. This is accomplished by providing a support member and a lid having a gas-permeable film and a substantially gas-impermeable film. A first heat-weld bonds the gas-permeable film to the support member and a second heat-weld bonds the gas-impermeable film to the gas-permeable film. The first and second heat-welds each have a bond-strength which is greater than the intra-film cohesive strength of the gas-permeable film so that the lid preferentially delaminates within the gas-permeable film upon peeling, thereby leaving a portion of the gas-permeable film lidded to the support member.

25 Claims, 7 Drawing Sheets

U.S. PATENT DOCUMENTS

| | | | |
|---|---|---|---|
| 2,623,826 | 12/1952 | Grinstead | 99/174 |
| 2,814,381 | 11/1957 | Stevick | 206/45 |
| 2,925,346 | 2/1960 | Harper et al. | 99/174 |
| 3,019,573 | 2/1962 | Navikas | 53/27 |
| 3,074,798 | 1/1963 | Palmer | 99/174 |
| 3,360,382 | 12/1967 | Miller | 99/174 |
| 3,561,668 | 2/1971 | Bergstrom | 229/43 |
| 3,574,642 | 4/1971 | Weinke | 99/174 |
| 3,681,092 | 8/1972 | Titchenal et al. | 99/174 |
| 3,713,849 | 1/1973 | Grindrod et al. | 99/174 |
| 3,716,180 | 2/1973 | Bemiss et al. | 299/13 |
| 3,783,089 | 1/1974 | Hurst et al. | 161/166 |
| 3,808,394 | 4/1974 | Mominee et al. | 219/121 |
| 3,843,806 | 10/1974 | Kishpaugh et al. | 426/106 |
| 4,055,672 | 10/1977 | Hirsch et al. | 426/127 |
| 4,264,392 | 4/1981 | Watt | 156/272 |
| 4,438,850 | 3/1984 | Kahn | 206/634 |
| 4,522,835 | 6/1985 | Woodruff et al. | 426/264 |
| 4,590,078 | 5/1986 | Umina | 426/113 |
| 4,634,614 | 1/1987 | Holzner | 428/35 |
| 4,667,814 | 5/1987 | Wakamatsu et al. | 206/0.7 |
| 4,700,531 | 10/1987 | Hsu et al. | 53/412 |
| 4,840,271 | 6/1989 | Garwood | 206/213 |
| 4,842,875 | 6/1989 | Anderson | 426/118 |
| 4,847,148 | 7/1989 | Schirmer | 428/332 |
| 4,886,372 | 12/1989 | Greengrass et al. | 383/100 |
| 4,886,690 | 12/1989 | Davis et al. | 428/36.6 |
| 4,889,731 | 12/1989 | Williams, Jr. | 426/106 |
| 4,910,033 | 3/1990 | Bekele et al. | 426/129 |
| 5,045,331 | 9/1991 | Antoon, Jr. | 426/118 |
| 5,079,059 | 1/1992 | Wyslotsky | 428/43 |
| 5,132,151 | 7/1992 | Graney | 428/40 |
| 5,226,531 | 7/1993 | Garwood | 206/213 |
| 5,296,291 | 3/1994 | Mueller | 428/349 |
| 5,348,752 | 9/1994 | Gorlich | 426/129 |
| 5,402,622 | 4/1995 | Stockley, III et al. | 53/427 |
| 5,419,096 | 5/1995 | Gorlich | 53/432 |
| 5,419,097 | 5/1995 | Gorlich et al. | 53/432 |
| 5,439,132 | 8/1995 | Gorlich | 220/359 |
| 5,492,705 | 2/1996 | Porchia et al. | 426/106 |
| 5,518,790 | 5/1996 | Huber et al. | 428/35.2 |
| 5,560,182 | 10/1996 | Garwood | 53/432 |
| 5,686,126 | 11/1997 | Noel et al. | 426/127 |
| 5,759,650 | 6/1998 | Raines et al. | 428/35.7 |

FOREIGN PATENT DOCUMENTS

| | | |
|---|---|---|
| 0 261 930 | 9/1987 | (EP) . |
| 0 270 764 | 10/1987 | (EP) . |
| 0 698 563 A1 | 8/1995 | (EP) . |
| 721 899 | 7/1996 | (EP) . |
| 2 323 594 | 9/1975 | (FR) . |
| 2 251 540 | 1/1991 | (GB) . |
| 87/02965 | 11/1985 | (WO) . |
| WO 90/01005 | 2/1990 | (WO) . |

* cited by examiner

PACKAGE HAVING A DUAL-FILM LID COMPRISING A GAS-IMPERMEABLE FILM AND A DELAMINATABLE, GAS-PERMEABLE FILM

This application is a Continuation-in-Part of U.S. Ser. No. 08/471,065, filed Jun. 6, 1995 now U.S. Pat. No. 5,686,126.

BACKGROUND OF THE INVENTION

The present invention relates to packaging for products, such as food products, which are enclosed under certain environmental conditions in a support member having a lid which peelably delaminates (i.e., delaminates upon peeling) to expose a gas-permeable film, thereby causing a change in the environmental conditions within the package. More specifically, the invention relates to such packaging for fresh red meat products.

Historically, large sub-primal cuts of meat have been butchered and packaged in each supermarket. This arrangement has long been recognized to be inefficient and expensive. It would instead be preferable to butcher and package the meat at a central processing facility which benefits from economies of scale, and then ship the packaged meat to individual supermarkets or other retail outlets such as is done, for example, with many poultry products. It is believed that central processing of meat would also lead to a higher quality, more sanitary product with a longer shelf-life than meat which is butchered and packaged in individual supermarkets.

Fresh red meat presents a particular challenge to the concept of centralized processing and packaging due to its oxygen-sensitivity. Such oxygen-sensitivity is manifested in the shelf-life and appearance (color) of a packaged meat product. For example, while a low-oxygen packaging environment generally increases the shelf-life of a packaged meat product (relative to meat products packaged in an environment having a higher oxygen content), red meat has a tendency to assume a purple color when packaged in the absence of oxygen or in an environment having a very low oxygen concentration, i.e., below about 5% oxygen. Unfortunately, such a purple color is undesirable to most consumers, and marketing efforts to teach the consumer about the acceptability of the purple color have been largely ineffective. When meat is exposed to a sufficiently high concentration of oxygen, e.g., as found in air, it assumes a bright red color which most consumers associate with freshness. After 1 to 3 days of such exposure, however, meat assumes a brown color which, like the purple color, is undesirable to most consumers (and indicates that the meat is beginning to spoil).

Thus, in order to effectively butcher and package meat products in a central facility for distribution to retail outlets, the meat would desirably be packaged, shipped, and stored in a low-oxygen environment for extended shelf-life, and then displayed for consumer sale in a relatively high-oxygen environment such that the meat is caused to "bloom" into a red color just before being placed in a retail display case. While in the retail display case, the meat product is desirably contained in a package which protects it from microbial and other contamination. In order to attain the maximum economic benefit from centralized packaging, the package in which the meat product is displayed for consumer sale is the same package in which the meat product is initially packaged and shipped from the central processing facility. As can be appreciated, centralized butchering and packaging of fresh red meat presents a number of difficult packaging challenges.

A variety of packages have been developed in an effort to overcome the foregoing challenges. One attempted solution is to use a dual-film cover or lid over a support member, such as an oxygen-barrier tray, which contains the meat product. The support member generally includes a cavity, in which the product is contained, surrounded by a peripheral flange to which the lid is secured. One film of the dual-film lid is relatively oxygen-impermeable, i.e., provides a substantial barrier to the passage of oxygen therethrough, and is removably positioned above a second film that is relatively oxygen-permeable, i.e., sufficiently permeable to the passage of oxygen to allow the packaged meat product to bloom. Thus, the package may be shipped with the upper, impermeable film intact so that a low-oxygen environment may be maintained within the package during shipping. Then the impermeable film may be removed at the supermarket just prior to placing the package in a retail display case. Since the lower film is oxygen permeable, it allows the meat product to bloom in the presence of oxygen which enters the package from the ambient atmosphere.

Conventional dual-film packaging arrangements can employ either separate, discrete permeable and impermeable lids which are attached separately to the support member, or a single, peelable lid which may delaminate into permeable and impermeable films. With the separate film approach, the permeable and impermeable lids are typically sealed to separate locations on the support member flange, with the permeable lid being sealed to an inner periphery of the flange and the impermeable lid being sealed to an outer periphery of the flange, i.e., outboard of the flange area at which the permeable lid is sealed. One drawback of this approach is the difficulty of sealing two separate lids to a conventional, single-flange tray in an automated fashion, i.e., continuously from separate permeable and impermeable webs of film. The permeable lid must be applied to the tray flange from a continuous web, secured (e.g., heat-welded) to an inner periphery of the flange, and then severed from the web in such a manner as to leave a sufficient area on an outer periphery of the flange to which the impermeable lid can be secured and severed from a continuous web of an impermeable film. Since this approach involves two separate lidding operations, it entails a relatively complex and expensive packaging procedure (as compared to a single-lid packaging operation). For example, it is difficult to sever the permeable lid from the web in such a manner that sufficient room is left on the outer periphery of the flange to provide a sealing surface for the impermeable lid without damaging the outer flange periphery. It is also difficult to completely remove atmospheric oxygen from the space between the permeable and impermeable lids.

While single, peelable lids have the advantage of providing a single web for sealing to a conventional tray flange, such films often fail during peeling, with the impermeable film either being difficult to delaminate from the permeable film or with all or part of the permeable film remaining bonded to the impermeable film and tearing away from the rest of the package, thereby resulting in tears or holes in the package which expose the packaged meat product to dirt or contamination. The primary difficulty in achieving consistent and reliable peelability in a single, peelable lid lies in the manner in which the permeable and impermeable films are adhered to one another. That is, with conventional peelable lids, the same mechanism which bonds the permeable and impermeable films is also relied upon to allow the two films to be peelably separated. Such mechanisms include, e.g., the use of heat and pressure (e.g., heated rollers) to bond the two films, or an adhesive layer sandwiched between and bonding the two films. The bond which is formed must be strong enough to prevent film separation during shipping and storage so that oxygen does not prematurely enter the package via the gas-permeable film (i.e., prior to the time when the retail worker intentionally peels the impermeable film from the permeable film). At the same time, the bond between the two films must provide sufficient peelability that the two films can be separated without tearing or otherwise compromising the permeable film as noted above. As can be readily appreciated, these are difficult and somewhat conflicting requirements to meet. Not only can the strength of the bond between the permeable and impermeable films vary due to manufacturing fluctuations, the bond-strength can also change over time due to, e.g., migration of components (e.g., antifog agents) within one or both films to the interface between the films, temperature variations, etc., all of which can cause physical and/or chemical changes to the bond.

Accordingly, there is a need in the art for a dual-film package which combines the manufacturing simplicity of a package having a single, peelable lid with the consistent peelability of a package having separate permeable and impermeable lids.

SUMMARY OF THE INVENTION

That need is met by the present invention which provides a package, comprising:

a. a product support member having a cavity formed therein, a product being disposed within the cavity;

b. a lid enclosing the product within the cavity of the support member, the lid comprising a gas-permeable film and a substantially gas-impermeable film;

c. a first heat-weld which bonds the gas-permeable film to the support member; and d. a second heat-weld which bonds the gas-impermeable film to the gas-permeable film, the first and second heat-welds each having a bond-strength which is greater than the intra-film cohesive strength of the gas-permeable film so that the lid preferentially delaminates within the gas-permeable film upon peeling.

The invention also provides a packaging method, comprising:

a. providing a product support member having a cavity formed therein;

b. placing a product in the cavity;

c. providing a lid comprising a gas-permeable film and a substantially gas-impermeable film; and d. placing the lid over the support member and applying sufficient heat and pressure to the lid to enclose the product within the cavity of the support member by forming a first heat-weld which bonds the gas-permeable film to said support member, and a second heat-weld which bonds the gas-impermeable film to the gas-permeable film, the first and second heat-welds each having a bond-strength which is greater than the intra-film cohesive strength of the gas-permeable film so that the lid preferentially delaminates within the gas-permeable film upon peeling.

The first and second heat-welds direct the peeling force into a plane or region of relatively low cohesive or adhesive strength within the gas-permeable film so that the lid consistently delaminates within that film. The present invention thus provides a simple and reliable peel mechanism for a package having a dual-film lid which combines the manufacturing simplicity of a package having a single, peelable lid with the consistent peelability of a package having separate permeable and impermeable lids.

DEFINITIONS

As used herein, the term "film" refers to a thermoplastic material, generally in sheet or web form, having one or more layers of polymeric or other materials which may be bonded together by any suitable means well known in the art, e.g., coextrusion, lamination, etc. A film can be a monolayer film (having only one layer), or a multilayer film (having two or more layers).

As used herein, the term "layer" refers to a discrete film component which is coextensive with the film and has a substantially uniform composition. In a monolayer film, the "film" and "layer" would be one and the same.

As used herein, the phrase "gas-permeable" refers to a film or film portion which admits at least about 1,000 cc of gas, such as oxygen, per square meter of film per 24 hour period at 1 atmosphere and at a temperature of 73° F. (at 0% relative humidity). More preferably, a gas-permeable film or film portion admits at least 5,000, even more preferably at least 10,000, such as at least 15,000, 20,000, 25,000, 30,000, 35,000, 40,000, and 50,000, and most preferably at least 100,000 cc of oxygen per square meter per 24 hour period at 1 atmosphere and at a temperature of 73° F. (at 0% relative humidity). Typical gas transmission rates for gas-permeable film and film portions in accordance with the present invention range from 1,000 to 100,000, preferably 5,000 to 95,000, such as 10,000 to 90,000, 15,000 to 85,000, 20,000 to 80,000, 25,000 to 75,000, 30,000 to 70,000, and 40,000 to 60,000 cc of oxygen per square meter per 24 hour period at 1 atmosphere and at a temperature of 73° F. (at 0% relative humidity). In accordance with the present invention, a gas-permeable film or film portion can itself have the aforedescribed levels of gas permeability or, alternatively, can be a film or film portion which does not inherently possess the aforedescribed levels of gas permeability but which is altered, e.g., perforated or peelably delamiinated, to render the film gas-permeable as defined above.

As used herein, the phrase "substantially gas-impermeable" refers to a film or film portion which admits less than 1000 cc of gas, such as oxygen, per square meter of film per 24 hour period at 1 atmosphere and at a temperature of 73° F. (at 0% relative humidity). More preferably, a substantially gas-impermeable film admits less than about 500, such as less than 300, and less than 100 cc of gas, more preferably still less than about 50 cc, and most preferably less than 25 cc, such as less than 20, less than 15, less than 10, less than 5, and less than 1 cc of gas per square meter per 24 hour period at 1 atmosphere and at a temperature of 73° F. (at 0% relative humidity).

As used herein, the phrase "product support member" refers to a component of a package on or in which a product is disposed. Meat products are typically disposed in a tray-like package component comprising, e.g., expanded polystyrene sheet material which has been thermoformed into a desired shape, for supporting the meat product. A product support member preferably includes a cavity into which the product is disposed and a peripheral flange which provides a sealing surface for attachment of a lid to the support member to thereby enclose the product within the cavity.

As used herein, the term "heat-weld" (also known as a "heat-seal") refers to the union of two films by bringing the films into contact, or at least close proximity, with one another and then applying sufficient heat and pressure to a predetermined area (or areas) of the films to cause the contacting surfaces of the films in the predetermined area to become molten and intermix with one another, thereby forming an essentially inseparable bond between the two films in the predetermined area when the heat and pressure are removed therefrom and the area is allowed to cool. Two or more heat-welds uniting three or more films may be formed simultaneously by bringing three or more films into contact and applying heat and pressure in a predetermined area as just described, thereby causing the contacting surfaces of the three or more films in the predetermined area to form two or more essentially inseparable bonds between the three or more films in the predetermined area. A heat-weld may also be formed between two layers within a film or across an adhesive layer already bonding two films together (either as a single heat-weld or as a pair of heat-welds between the adhesive layer and each of the films bonded thereto). In accordance with the practice of the present invention, a heat-weld preferably creates a hermetic seal, i.e., a barrier to the outside atmosphere.

As used herein, the term "bond-strength" refers generally to the adhesive force with which two adjacent films, or two adjacent film layers, are connected and, more specifically, to the force with which two films are connected by a heat-weld. Bond-strength can be measured by the force required to separate two films or film layers that are connected, e.g., via a heat-weld, in accordance with ASTM F88-94.

As used herein, the term "intra-film cohesive strength" refers to the internal force with which a film remains intact, as measured in a direction that is perpendicular to the plane of the film. In a multilayer film, intra-film cohesive strength is provided both by inter-layer adhesion (the adhesive strength between the layers which binds them to one another) and by the intra-layer cohesion of each film layer (i.e., the cohesive strength of each of the film layers). In a monolayer film, intra-film cohesive strength is provided only by the intra-layer cohesion of the layer which constitutes the film.

As used herein, the phrase "preferentially delaminates" refers to the tendency of a film or multiple-film composite to delaminate at a predetermined layer/layer interface, and/or within a layer, of the film or one of the films of the composite upon peeling. Although it may be possible to delaminate such a film or multiple-film composite at other interfaces or within other layers of the film or composite, in almost all cases the film or composite will delaminate at the predetermined interface and/or layer. Preferential delamination is controlled by factors such as, e.g., the structure of the films, the manner in which the films are attached in the composite, the existence and placement of heat-welds, etc. A lid in accordance with the present invention is a multiple-film composite including a gas-permeable film and a gas-impermeable film. Preferential delamination within the gas-permeable film is achieved by providing a pair of heat-welds on both major surfaces of the gas-permeable film, each of which having a bond-strength which is greater than the intra-film cohesive strength of the gas-permeable film so that when the lid is subjected to a peeling force, the heat-welds direct the peeling force into the gas-permeable film since it offers less resistance to delamination than either of the heat-welds which bracket the gas-permeable film.

As used herein, the terms "peel," "peeling," and the like refer to the act of removing one or more layers from a multilayer film or multiple-film composite by manually grasping and pulling back the layers along a plane or interface of relatively low bond-strength or within a layer having relatively weak intra-layer cohesion.

As used herein, the term "peel-force" refers to the amount of force required to separate two layers of a multilayer film or multiple-film composite, and is measured in accordance with ASTM F904-91.

As used herein, the phrase "sealant film" refers to a film which is conformably bonded to at least one of the exterior surfaces of a product support member. Preferably, the sealant film is bonded to the upper, as opposed to the lower, exterior surface of the support member and is a substantially gas-impermeable film.

As used herein, the phrase "ethylene/alpha-olefin copolymer" generally designates copolymers of ethylene with one or more comonomers selected from $C_3$ to $C_{20}$ alpha-olefins, such as 1-butene, 1-pentene, 1-hexene, 1-octene, methyl pentene and the like, in which the polymer molecules comprise long chains with relatively few side chain branches. These polymers are obtained by low pressure polymerization processes and the side branching which is present will be short compared to non-linear polyethylenes (e.g., LDPE, a low density polyethylene homopolymer). Ethylene/alpha-olefin copolymers generally have a density in the range of from about 0.86 g/cc to about 0.94 g/cc. The term linear low density polyethylene (LLDPE) is generally understood to include that group of ethylene/alpha-olefin copolymers which fall into the density range of about 0.915 to about 0.94 g/cc. Sometimes linear polyethylene in the density range from about 0.926 to about 0.94 is referred to as linear medium density polyethylene (LMDPE). Lower density ethylene/alpha-olefin copolymers may be referred to as very low density polyethylene (VLDPE, typically used to refer to the ethylene/butene copolymers available from Union Carbide with a density ranging from about 0.88 to about 0.91 g/cc) and ultra-low density polyethylene (ULDPE, typically used to refer to the ethylene/octene copolymers supplied by Dow).

The phrase "ethylene/alpha-olefin copolymer" also includes homogeneous polymers such as metallocene-catalyzed EXACT™ linear homogeneous ethylene/alpha-olefin copolymer resins obtainable from the Exxon Chemical Company, of Baytown, Tex.; TAFMER™ linear homogeneous ethylene/alpha-olefin copolymer resins obtainable from the Mitsui Petrochemical Corporation; and long-chain branched, metallocene-catalyzed homogeneous ethylene/alpha-olefin copolymers available from The Dow Chemical Company, known as AFFINITY™ resins. The phrase "homogeneous polymer" refers to polymerization reaction products of relatively narrow molecular weight distribution and relatively narrow composition distribution. Homogeneous polymers are structurally different from heterogeneous polymers (e.g., ULDPE, VLDPE, LLDPE, and LMDPE) in that homogeneous polymers exhibit a relatively even sequencing of comonomers within a chain, a mirroring of sequence distribution in all chains, and a similarity of length of all chains, i.e., a narrower molecular weight distribution. Furthermore, homogeneous polymers are typically prepared using metallocene, or other single-site type catalysts, rather than using Ziegler-Natta catalysts. Such single-site catalysts typically have only one type of catalytic site, which is believed to be the basis for the homgeniety of the polymers resulting from the polymerization.

DETAILED DESCRIPTION OF THE INVENTION

Figure 1:
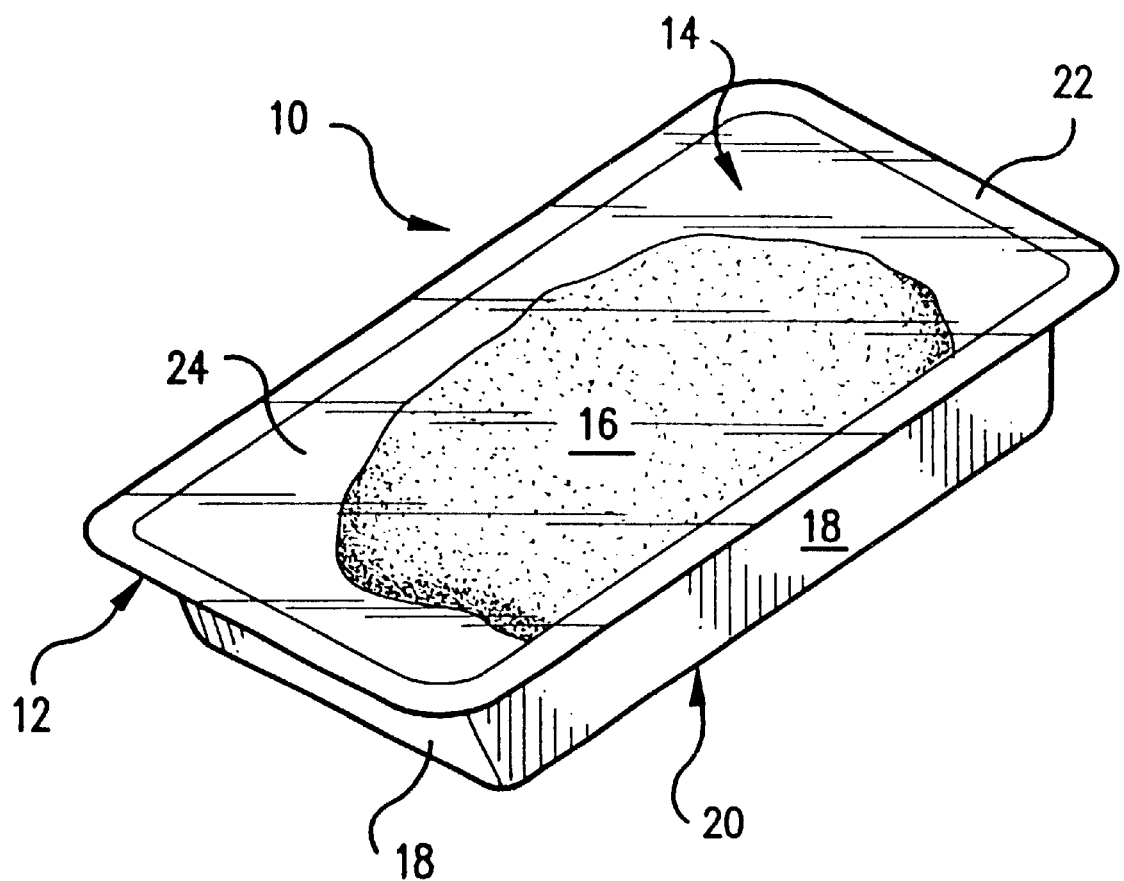
FIG. 1 is a perspective view a package in accordance with the present invention, including a product support member with a product disposed therein and a lid heat-welded to the support member to enclose the product therein, the lid comprising a gas-permeable film heat-welded to the support member and a gas-impermeable film heat-welded to and positioned above the gas-permeable film.

FIG. 1 illustrates package 10 which, in accordance with present invention, includes product support member 12 having a cavity 14 formed therein and a product 16 disposed within the cavity. Support member 12 is preferably in the form of a tray having side walls 18 and a base 20 which define the cavity 14, and further includes a peripheral flange 22 extending outwardly from the cavity. A lid 24 encloses the product 16 within cavity 14 by being heat-welded to flange 22.

Figure 2:
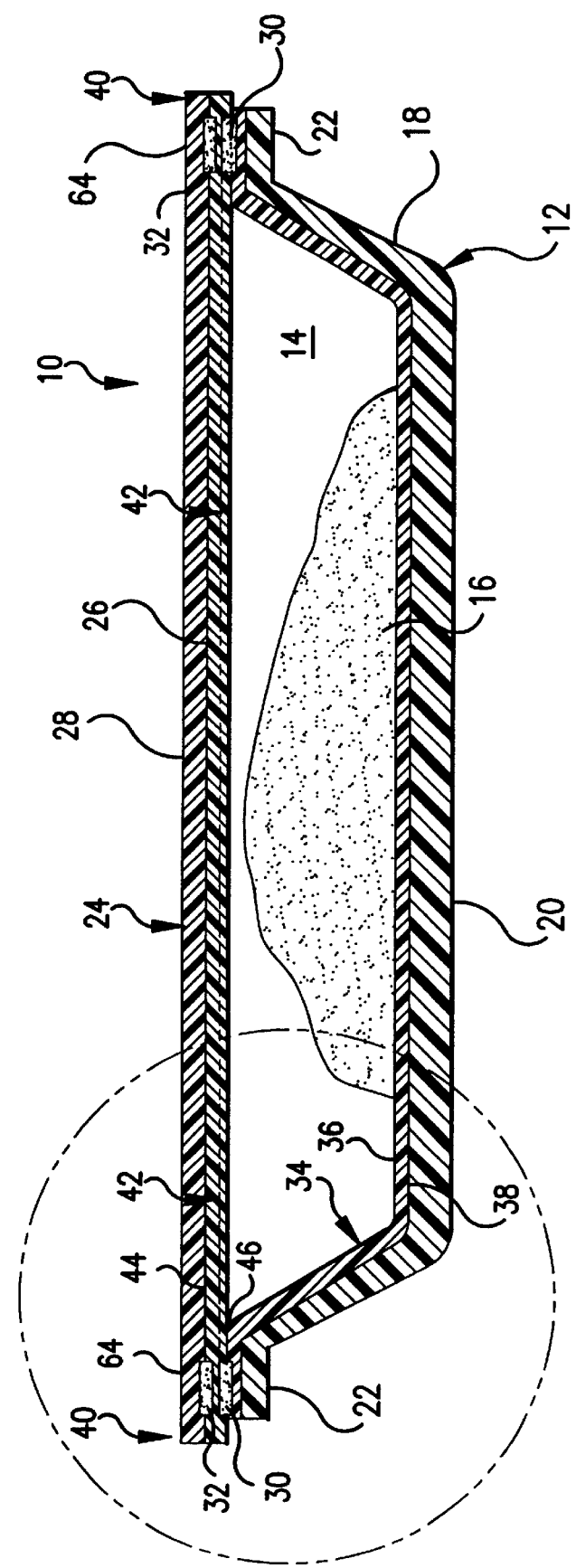
FIG. 2 is a schematic, cross-sectional view the package shown in FIG. 1.

FIG. 2 shows package 10 in greater detail. Lid 24 is a composite structure of two or more films which are bonded together by any suitable means such as, e.g., adhesive bonding, corona treatment, heat treatment (e.g., a heat-weld), pressure treatment, etc., including combinations thereof. At a minimum, lid 24 includes a gas-permeable film 26 and a substantially gas-impermeable film 28. Other films may be included as necessary or desired.

Lid 24 and support member 12 preferably form a substantially gas-impermeable enclosure for product 16 which substantially completely protects the product from contact with the surrounding environment including, in particular, atmospheric oxygen, but also including dirt, dust, moisture, microbial contaminates, etc., especially when product 16 is a food product. When product 16 is oxygen-sensitive, i.e., perishable, degradable, or otherwise changeable in the presence of oxygen, such as fresh red meat products (e.g., beef, veal, lamb, pork, etc.), poultry, fish, cheese, fruits, or vegetables, it is preferred that product 16 be packaged in a low-oxygen environment within package 10 to maximize the shelf-life of the product.

A first heat-weld 30 bonds gas-permeable film 26 to flange 22 of support member 12 while a second heat-weld 32 bonds gas-impermeable film 28 to gas-permeable film 26. Although flange 22 is illustrated as a simple, single-surface flange, various flange configurations are possible, and the gas-impermeable film 26 of lid 24 may be bonded to any desired upper surface thereof (i.e., generally upward facing surface of the flange as determined when the support member is in an upright position as shown). Preferably, first heat-weld 30 extends continuously around the upper surface of flange 22 to thereby hermetically seal product 16 within package 10.

Support member 12 preferably includes a sealant film 34 having an upper principal surface 36 and a lower principal surface 38. The lower surface 38 is bonded to cavity 14 and to the upper surface of flange 22. In this manner, the upper surface 38 of sealant film 34 defines the uppermost surface of support member 12 which is thereby in direct contact with product 16 in cavity 14 and in contact with gas-permeable film 26 of lid 24 on the upper surface of flange 22. More specifically, gas-permeable film 26 is actually bonded, via first heat-weld 30, to the upper surface 36 of sealant film 34 at flange 22. Thus, it is preferred that sealant film 34 fully lines, i.e., is conformably bonded to, the entire upper surface of support member 12. If desired, a second sealant film may be bonded to the lower surface of support member 12. It is to be understood that, although it is not required for support member 12 to include a sealant film, it is preferable to include such a sealant film as a liner for at least the upper surface of support member 12 as a means to improve the functional characteristics of the support member when such improvement is deemed necessary or desirable. For example, if the support member is constructed of a material which is not sufficiently gas-impermeable for the intended package application, a sealant film which provides the required degree of gas-impermeability may be employed. A sealant film may also be used to improve the bond-strength of the first heat-weld 30, i.e., when the gas-permeable film and support member are constructed of materials which are not readily capable of forming a sufficiently strong heat-weld, a sealant film may be used which both bonds well to the upper surface of the support member and also forms a strong heat-weld with the gas-permeable film.

Support member 12 can have any desired configuration or shape, e.g., rectangular, round, oval, etc. Similarly, flange 22 may have any desired shape or design, including a simple, substantially flat design which presents a single sealing surface as shown, or a more elaborate design which presents two or more sealing surfaces, such as the flange configurations disclosed in U.S. Pat. Nos. 5,348,752 and 5,439,132, the disclosures of which are hereby incorporated herein by reference. The flange may also include a peripheral lip positioned adjacent and exterior to the sealing surface to facilitate the peelable delamination of lid 24, such as disclosed in U.S. Ser. No. 08/733,843, entitled PACKAGE HAVING PEEL INITIATION MECHANISM and filed Oct. 18, 1996, the disclosure of which is hereby incorporated herein by reference.

Suitable materials from which support member 12 can be formed include, without limitation, polyvinyl chloride, polyethylene terephthalate, polystyrene, polyolefins such as high density polyethylene or polypropylene, paper pulp, nylon, polyurethane, etc. The support member may be foamed or non-foamed as desired, and preferably provides a barrier to the passage of oxygen therethrough, particularly when product 16 is a food product which is oxygen-sensitive. When such oxygen-sensitive products are to be packaged in a low-oxygen environment (to thereby extend their shelf-life), support member 12 preferably allows less than or equal to about 1000 cc of oxygen to pass, more preferably less than about 500 cc of oxygen, more preferably still less than about 100 cc, even more preferably less than about 50 cc, and most preferably less than about 25 cc of oxygen to pass per square meter of material per 24 hour period at 1 atmosphere and at a temperature of 73° F. (at 0% relative humidity). Support member 12 may be formed from a material which itself provides a barrier to the passage of oxygen, e.g., vinylidene chloride copolymer, nylon, polyethylene terephthalate, ethylene/vinyl alcohol copolymer, etc. Alternatively, support member 12 may have a substantially gas-impermeable sealant film 34 laminated or otherwise bonded to the inner or outer surface thereof as described above, and as also disclosed in U.S. Pat. Nos. 4,847,148 and 4,935,089, and in U.S. Ser. No. 08/326,176, filed Oct. 19, 1994 and entitled "Film/Substrate Composite Material" (published as EP 0 707 955 A1 on Apr. 24, 1996), the disclosures of which are hereby incorporated herein by reference. Sealant film 34 preferably includes an oxygen-barrier material such as e.g., vinylidene chloride copolymer (saran), nylon, polyethylene terephthalate, ethylene/vinyl alcohol copolymer, etc.

Although product 16 is illustrated as having a maximum height which is below the maximum height of support member 12, i.e., the level at which flange 22 is located, the invention is not limited to such "low profile" products. Rather, "high profile" products may also be packaged in accordance with the present invention, i.e., those having a maximum height which is above the level at which flange 22 is located so that the portion of the product which extends above the level of flange 22 will be in contact with lid 24.

An important aspect of the present invention is that first and second heat-welds 30 and 32 each have a bond-strength which is greater than the intra-film cohesive strength of gas-permeable film 26 of lid 24. In this manner, lid 24 preferentially delaminates within gas-permeable film 26 upon peeling. That is, when lid 24 is grasped by, e.g., a retail worker at outer edge 40 thereof, preferably at one of the four corners of support member 12, and pulled generally upwards and backwards (i.e., towards an opposite edge or corner of the package), lid 24 delaminates within gas-permeable film 26 as represented by the dashed line 42. This occurs because, as lid 24 is subjected to a peeling force in this manner, heat-welds 30 and 32 direct the peeling force into gas-permeable film 26 since it offers less resistance to delamination than either of the heat-welds 30 and 32 which bracket the gas-permeable film 26. By delaminating lid 24 in this fashion, not only is gas-impermeable film 28 removed from package 10 to thereby allow atmospheric oxygen to enter the package through gas-permeable film 26 (thus allowing a packaged oxygen-sensitive product to be changed in some desirable way, e.g., causing a packaged fresh red meat product to bloom to a bright red color), but the gas-permeable film 26 is reduced in thickness by virtue of being delaminated, thereby increasing the oxygen permeability of that film to allow for more rapid ingress of oxygen into the cavity 14 of the package 10.

Figure 3:
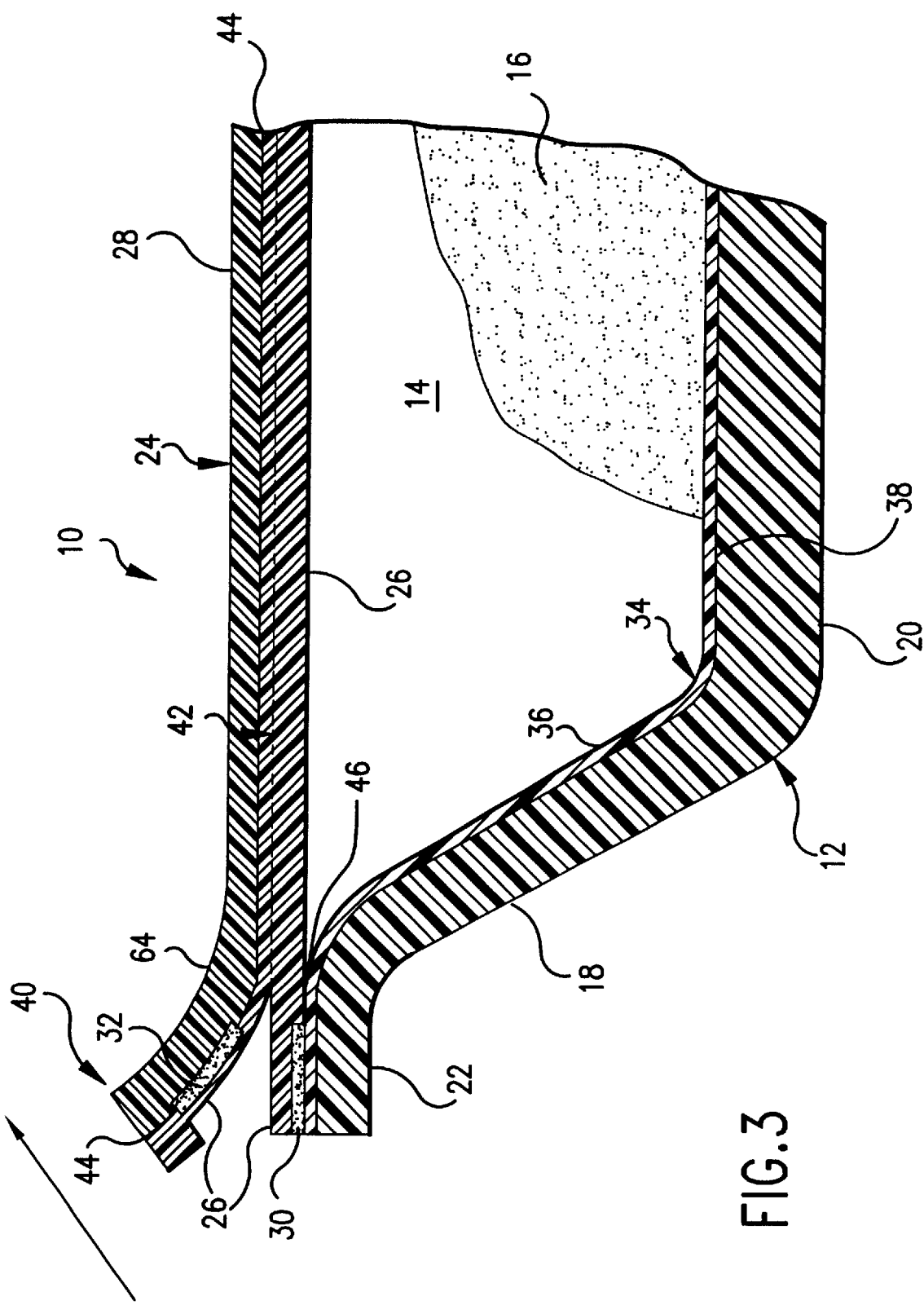
FIG. 3 is an enlarged cross-sectional view of a portion of the package illustrated in FIG. 2, wherein peelable delamination of the lid within the gas-permeable film has been initiated.
Figure 4:
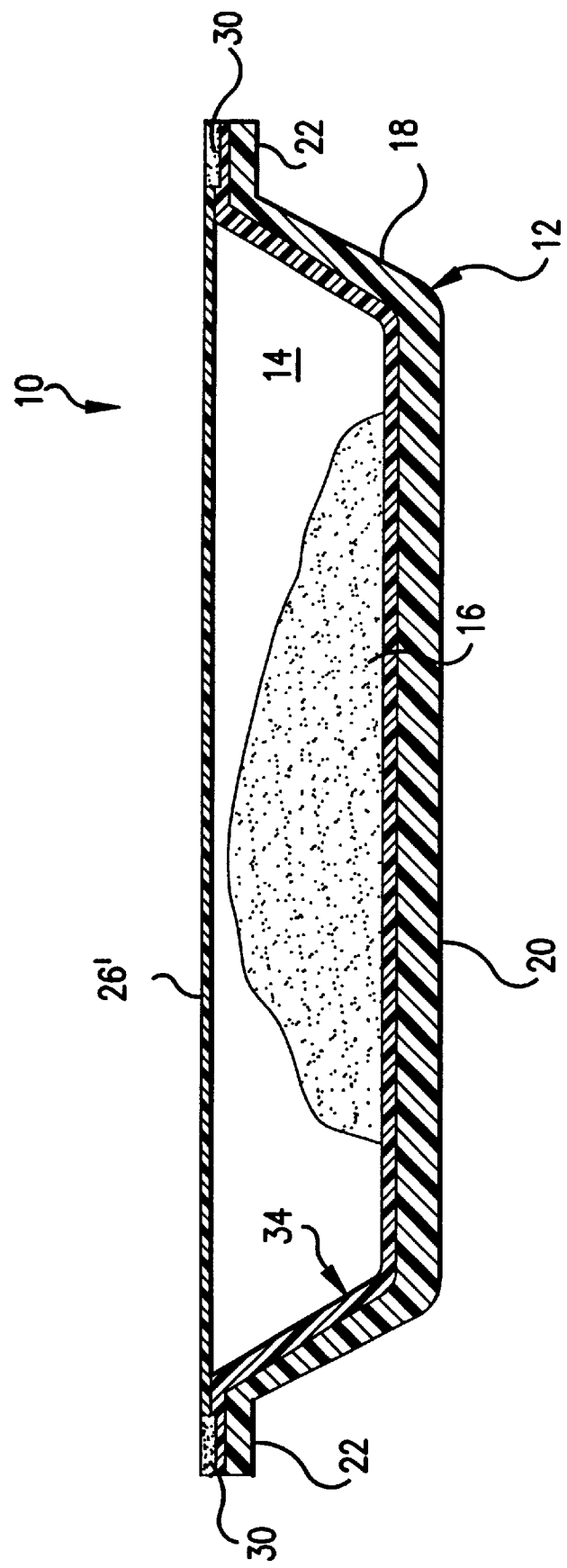
FIG. 4 is a schematic, cross-sectional view the package of FIGS. 2 and 3 wherein the lid has been peelably delaminated such that only a portion of the gas-permeable film remains lidded to the product support member.

FIG. 3 illustrates in greater detail the manner in which package 10 in accordance with the present invention provides preferential delamination within gas-permeable film 26 when lid 24 is subjected to a peeling force. Lid 24 is preferably fashioned such that an outer edge 40 thereof extends beyond, i.e., is exterior to, flange 22. In this manner, a retail worker or other person can easily grasp lid 24 at outer edge 40 to effect the delamination of lid 24 by applying a peeling force thereto in the general direction of the arrow in FIG. 3. When this occurs, heat-welds 30 and 32 direct the peeling force therebetween, i.e., into gas-permeable film 26 since it offers less resistance to delamination than either of the heat-welds 30 and 32 as explained above, thereby causing gas-permeable film 26 to begin to delaminate. If the peeling force continues to be applied, lid 24 will continue to delaminate within gas-permeable film 26 along line 42. As shown, all of gas-impermeable film 28 and a portion of gas-permeable film 26 are being removed from package 10 during the delamination process. The end result of the delamination process is shown in FIG. 4, wherein gas-impermeable film 28 and a portion of gas-permeable film 26 have been removed from package 10 such that only a thinner portion of gas-permeable film 26, designated as 26', remains attached to support member 12. In this manner, product 16 remains fully enclosed within package 10, i.e., gas-permeable film 26' is still heat-welded to flange 22 of support member 12 via first heat-weld 30 and continues to protect the product from microbial and other contaminates. However, atmospheric oxygen can now enter the cavity 14 of package 10 through the now-exposed gas-permeable film 26'. Moreover, since the gas-permeable film has been rendered thinner by the delamination process, the rate of gas-transmission therethrough increases. If product 16 is a fresh red meat product originally packaged in a gas which is lower in oxygen content than air, the increased rate of gas-transmission through gas-permeable film 26' results in a faster exchange of atmospheric oxygen for the packaging gas, thereby leading to a more rapid blooming of the fresh red meat product. In this manner, package 10 as shown in FIG. 4 can more rapidly be displayed for consumer purchase, i.e., the delay time in waiting for the fresh red meat product to bloom to an acceptable color of red is reduced. This is an advantageous feature of the present invention.

Referring back to FIG. 3, preferred means for achieving preferential delamination within gas-permeable film 26 will be described. Important to the achievement of preferential delamination are heat-welds 30 and 32. Each of films 26 and 28 preferably comprise at least one material at the interface 44 therebetween which is capable of forming a heat-weld with the other material. Similarly, each of films 26 and 34 preferably comprise at least one material at the interface 46 therebetween which is capable of forming a heat-weld with the other material. As shown more clearly in FIG. 5, films 26, 28, and 34 are preferably multilayer films which are constructed such that the layers which are present at interfaces 44 and 46 are formed from materials which are capable of forming heat-welds with the material from which the adjacent interface layer is formed. In this manner, heat-welds 30 and 32 bridge both of the interfaces 44 and 46, thereby joining films 26, 28, and 34 at such interfaces.

Figure 5:
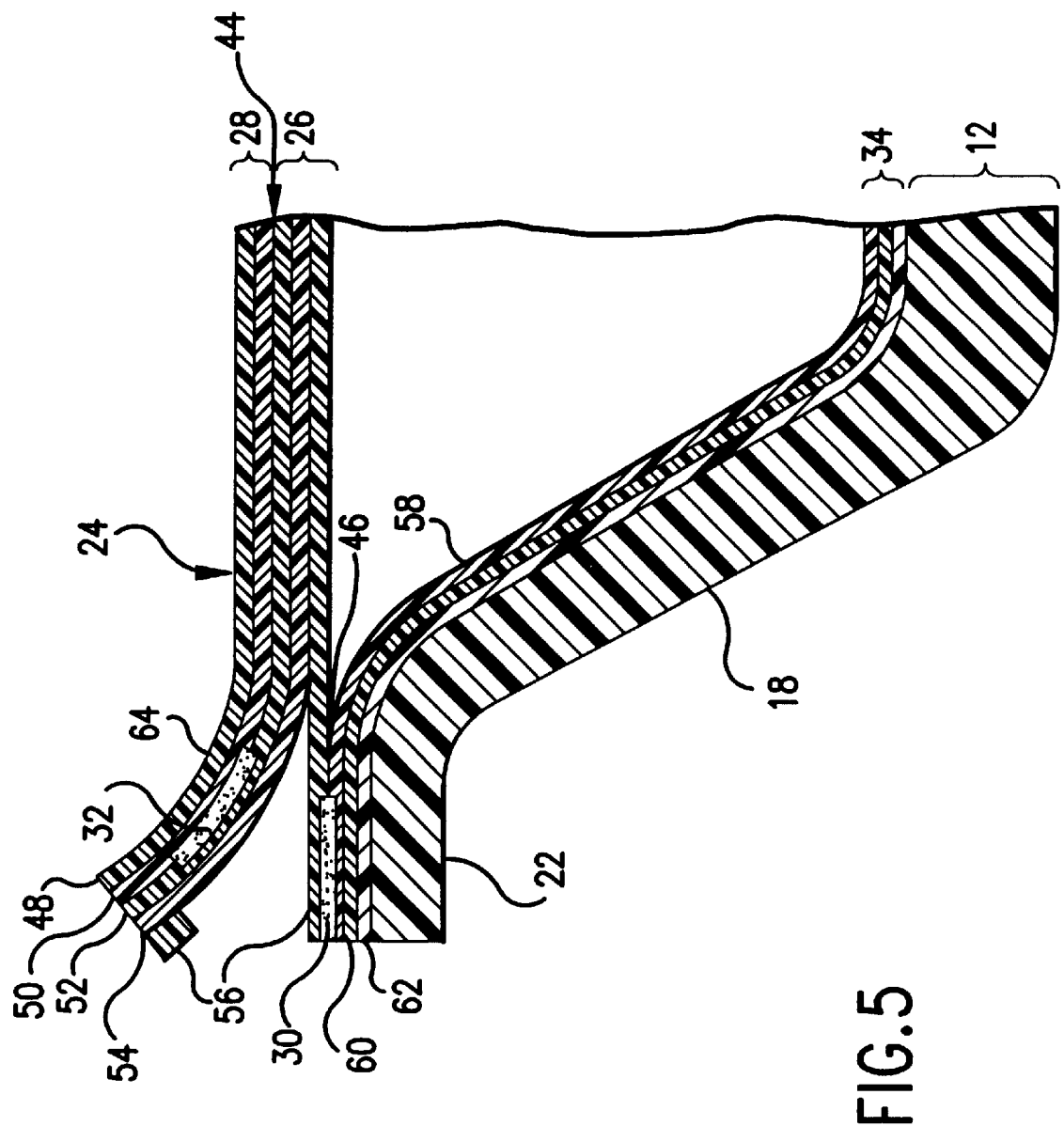
FIG. 5 is an enlarged cross-sectional view of a portion of the package illustrated in FIG. 3.

FIG. 5 illustrates in greater detail the portion of package 10 within the circle set forth in FIG. 3. As shown, gas-impermeable film 28 is preferably at least a two-layer film including oxygen-barrier layer 48 and heat-weld layer 50; gas-permeable film 26 is preferably at least a three-layer film including first heat-weld layer 52, interior layer 54, and second heat-weld layer 56; and sealant film 34 is preferably at least a three-layer film including heat-weld layer 58, oxygen-barrier layer 60, and bonding layer 62. Each of heat-weld layers 50 and 52, which are in contact with one another at interface 44 of gas-impermeable film 28 and gas-permeable film 26, preferably comprise at least one material which is capable of forming a heat-weld with the other material. Similarly, each of heat-weld layers 56 and 58, which are in contact with one another at interface 46 of gas-permeable film 26 and sealant film 34, preferably comprise at least one material which is capable of forming a heat-weld with the other material. (Such materials which are capable of forming a heat-weld with one another are hereinafter referred to as "compatible materials.") In this manner, when sufficient heat and pressure are applied to films 26, 28, and 34 on flange 22 of support member 12, heat-welds 30 and 32 are formed.

Preferred examples of compatible materials for inclusion in heat-weld layers 50/52 and 56/58 include polyethylene homopolymers such as, e.g., low density polyethylene or high density polyethylene, and polyethylene copolymers such as, e.g., ethylene/alpha-olefin copolymers. The same polyethylene or a different polyethylene may be included in adjacent layers 50/52 and 56/58, provided that the polyethylenes chosen for inclusion in such adjacent layers are capable of forming heat-welds with one another across interfaces 44 and 46, respectively. Other compatible materials, e.g., polypropylenes or other polyolefins, such as ethylene/vinyl acetate, ethylene/butyl acrylate, ionomers, etc.

Heat-welds 30 and 32 are preferably formed simultaneously by applying heat and pressure to the upper surface 64 of lid 24 in the areas where the heat-welds are desired to be formed, preferably peripherally around flange 22 to completely enclose product 16 within package 10. Any conventional heating element may be used to effect the heat-welds, e.g., a heated metal element having a contact surface which essentially mirrors the shape of, but has a slightly narrower width than, peripheral flange 22. After lid 24 has been placed over support member 12 as shown in FIG. 2, the heated metal element is pressed into contact with the upper surface 64 of lid 24 to thereby squeeze lid 24 between the heated element and flange 22 of support member 12. The amount of heat and pressure which are necessary to effect heat-welds 30 and 32 are dependent upon a number of factors, e.g., the thickness and composition of lid 24, and can readily be determined by one having ordinary skill in the art to which this invention pertains.

The heat and pressure which are applied to the upper surface 64 of lid 24 are preferably sufficient to cause simultaneous heat-welding of all adjacent layers comprising materials which are compatible with one another. In this manner, such adjacent layers are fused together via heat-welds throughout the cross-sectional thickness of lid 24 in the area beneath the contact surface of the heated element. As shown, heat-weld 32 extends into and bonds layers 50 and 52 across interface 44, but could also extend into layer 48 if that layer contains a material which is compatible with one or more materials from which layer 50 is formed. If films 26 and 28 are bonded with an adhesive to form lid 24 prior to being heat-welded to support member 12, layers 50 and 52 are preferably compatible with the adhesive material (not shown) so that any such adhesive bond is not weakened by heat-welding. In most cases, it is believed that a single or separate heat-welds will form between layers 50, 52 and the adhesive layer to thereby strengthen the bond between films 26 and 28 in the area of flange 22.

Heat-weld 30 extends into and bonds layers 56 and 58 across interface 46, and may also extend into layers 54 and/or 60 and/or 62 as desired, depending upon whether those layers are formed from materials which are compatible with one another.

Preferably, layers 54 and 56 comprise materials which are not compatible with one another so that no heat-weld, or a relatively weak heat-weld, is formed across those layers. More preferably, layers 54 and 56 separate from one another when lid 24 is subjected to a peel-force ranging from 0.001 to 2.5 pounds per inch (more preferred peel-force ranges are set forth below). That is, the inter-layer adhesion between layers 54 and 56 is preferably such that the two layers will peelably separate from one another at a peel-force ranging from 0.001 to 2.5 pounds per inch. The inter-layer adhesion between layers 54 and 56 preferably represents not only the weakest component of the intra-film cohesive strength of gas-permeable film 26, but also the weakest cohesive or adhesive bond within lid 24 after heat-welds 30 and 32 have been formed. In this fashion, when lid 24 is subjected to a peel-force ranging from 0.001 to 2.5 pounds per inch, such peel-force is channeled between heat-welds 30 and 32 and into gas-permeable film 26 at the interface of layers 54 and 56 whereupon the lid delaminates within the gas-permeable film. As shown, layers 52 and 54 of gas-permeable film 26 is peelably removed from package 10 along with layers 48 and 50 of gas-impermeable film 28. Layer 56 of gas-permeable film 26, however, remains attached to support member 12 so that product 16 remains enclosed within package 10.

Peelable separation of adjacent film layers 54 and 56 can be achieved by constructing gas-permeable film 26 such that one of layers 54 or 56 comprises polyethylene homopolymer or copolymer while the other layer comprises at least one material selected from the group consisting of polyamide, copolyamide, polyester, copolyester, polyethylene homopolymer or copolymer, and polypropylene homopolymer or copolymer. For example, one of layers 54 or 56 (preferably layer 56) may comprise an ethylene/alpha-olefin copolymer, such as linear low density polyethylene or linear medium density polyethylene, while the other of layers 54 or 56 (preferably layer 54) may comprise a polyamide or an ethylene/vinyl alcohol copolymer. Construction of gas-permeable film 26 in this manner also ensures that no heat-weld or a relatively weak heat-weld will be formed between layers 54 and 56 to further promote the preferential delamination of gas-permeable film 26. Of course, any two adjacent layers within gas-permeable film 26 may be designed for delamination at the interface therebetween by proper selection of the materials from which such layers are formed in accordance with the above description.

As an alternative to providing for inter-layer adhesive separation as a means of achieving preferential delamination within gas-permeable film 26, the gas-permeable film may comprises at least one layer which internally separates when said lid is subjected to a peel-force ranging from 0.001 to 2.5 pounds per inch. That is, one or more of the film layers composing gas-permeable film 26 may be formulated to have an inter-layer cohesive strength which presents the weakest cohesive or adhesive bond within lid 24 after heat-welds 30 and 32 have been formed. Thus, when lid 24 is subjected to a peel-force ranging from 0.001 to 2.5 pounds per inch, that peel-force is channeled between heat-welds 30 and 32 and into the layer of gas-permeable film 26 having a weak cohesive strength so that the gas-permeable film delaminates within such layer.

A combination of inter-layer adhesive failure and intra-layer cohesive failure within gas-permeable film 26 may also be empolyed, if desired, as a means of achieving preferential delamination of such film. This can occur, e.g., when the primary plane of delamination is between two adjacent film layers but the delamination path "wanders" into one or both of the adjacent film layers.

As mentioned above, gas-permeable film 26 preferably delaminates when lid 24 is subjected to a peel-force ranging from 0.001 to 2.5 pounds per inch, i.e., the intra-film cohesive strength of gas-permeable film 26 preferably ranges from a low of about 0.001 pounds per inch to a high of about 2.5 pounds per inch. A more preferred peel-force for delamination of gas-permeable film 26 is between 0.005 and 2 lb/inch and, more preferably, between 0.01 and 1.5 lb/inch. Most preferably, peel initiation (the peel force required to begin delamination) ranges from 0.5–2.5 lb/inch while peel delamination (the "steady-state" peel force after peel initiation) ranges from 0.01–1.0 lb/inch. A peel force falling within the foregoing ranges provides a balance between sufficient adhesion to prevent premature separation during manufacture, shipping and storage, and sufficient peelability so that gas-permeable film 26 can be delaminated without tearing or otherwise compromising the integrity of remaining portion 26' thereof. That is, a peel force of more than about 2.5 lb/inch results in a lidding film which tears or is difficult to peel. On the other hand, a peel force of less than about 0.001 lb/inch creates a greater likelihood of premature delamination.

Referring still to FIG. 5, oxygen-barrier layers 48 and 60 preferably comprise a material which provides a substantial barrier to the passage of gas, particularly oxygen, therethrough so that films 28 and 34 are substantially gas-impermeable. Suitable materials include, e.g., vinylidene chloride copolymer (saran), nylon, polyethylene terephthalate, ethylene/vinyl alcohol copolymer, silicon oxides (SiOx), etc. Other materials may be employed in layers 48 and 60 as necessary or desired.

Bonding layer 62 preferably comprises a material which is capable of forming a bond with the material from which support member 12 is formed in accordance with the teachings set forth in the above-referenced U.S. Pat. Nos. 4,847,148 and 4,935,089, and U.S. Ser. No. 08/326,176, filed Oct. 19, 1994 and entitled "Film/Substrate Composite Material."

Each of films 26, 28 and 34 may have any desired thickness, ranging, e.g., from about 0.3 mils to about mils. Preferably, the films range in thickness from about 0.5 mils to about 2.5 mils, more preferably from about 0.75 mils to about 1.5 mil.

The above-described film structures as shown in FIG. 5 are intended to be illustrative only and not in any way limiting in scope of the present invention. A greater or lesser number of film layers may be included in films 26, 28, and 34 as desired or necessary. Specific films are illustrated in the Examples below.

Figure 6:
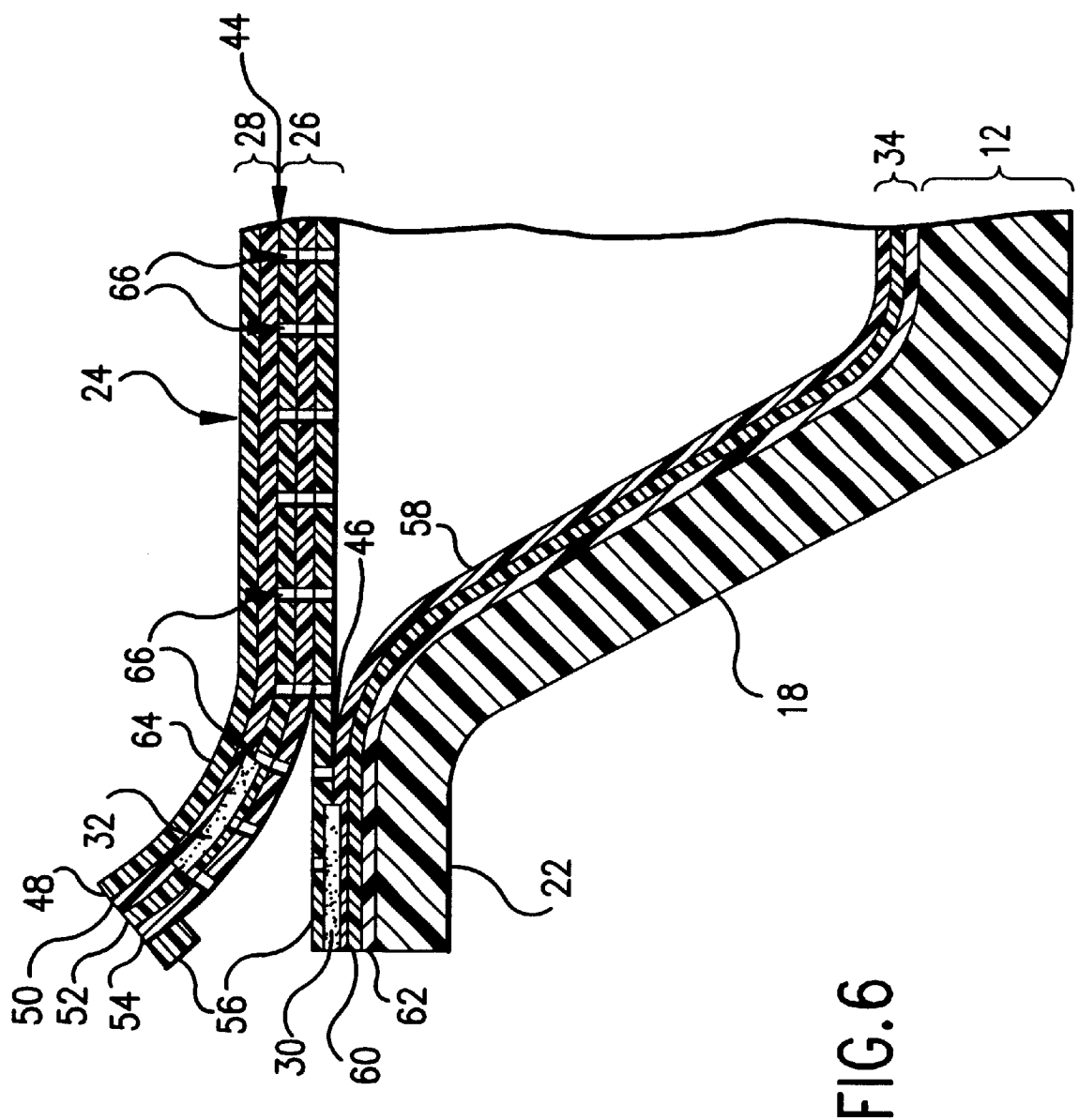
FIG. 6 illustrates another embodiment of the present invention and is similar to FIG. 5 except that the gas-permeable film is perforated.

In a particularly preferred embodiment of the present invention, gas-permeable film 26 is perforated as shown in FIG. 6. Perforations 66 are preferably formed in gas-permeable film 26 prior joining film 26 with gas-impermeable film 28 and bonding the films to support member 12. The perforations preferably extend completely through gas-permeable film 26 to form a passageway therethrough which extends from one major surface of the film to the other major surface. As shown in FIG. 6, when gas-permeable film 26 is delaminated, each of the perforations is separated into two portions along the interface between layers 54 and 56 of gas-permeable film 26. One portion extends through layers 52 and 54 and is removed with those layers, along with layers 48 and 50 of gas-impermeable film 28, when layers 48–54 are peeled from package 10. The other portion of the perforations extends through layer 56 of gas-permeable film 26, and therefore remains with package 10 along with layer 56 after lid 24 has been delaminated.

Figure 7:
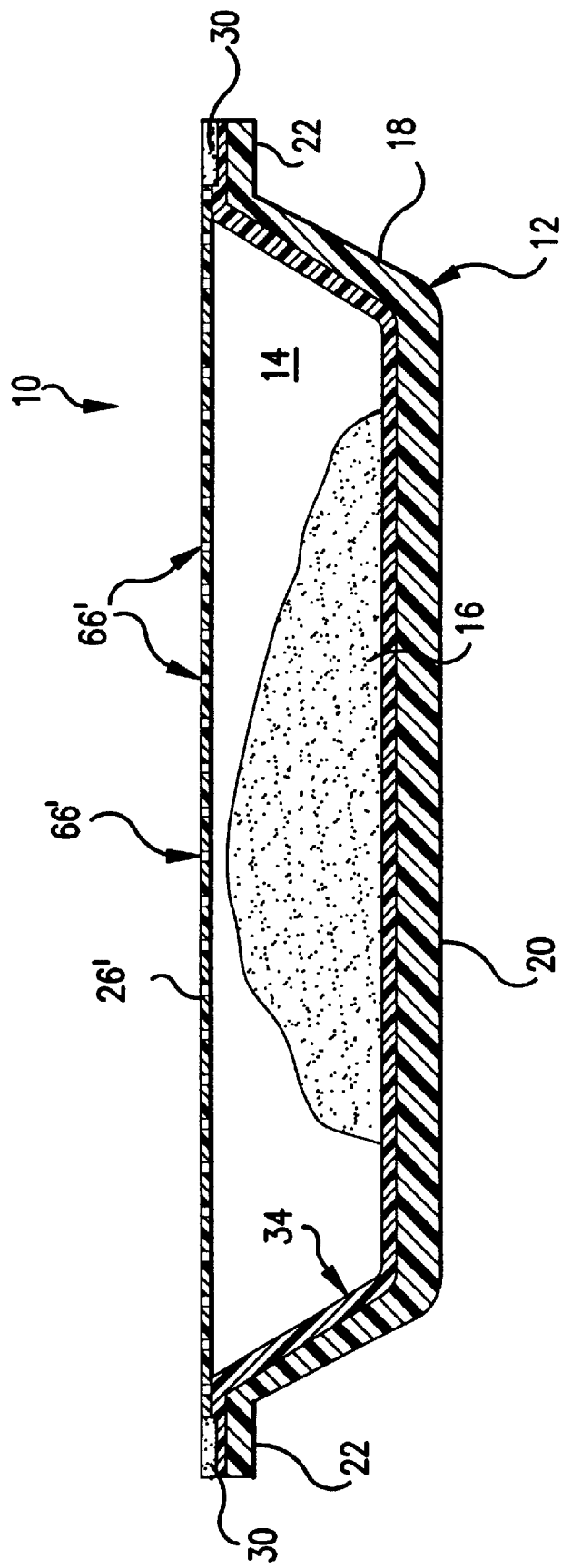
FIG. 7 is identical to FIG. 4 except that the portion of the gas-permeable film remaining lidded to the product support member is perforated.

The resultant package after lid 24 has been delaminated is shown in FIG. 7, wherein gas-permeable film 26', which remains bonded to support member 12, includes the remaining portion of perforations 66 (designated as 66'). At this point (e.g., just prior to placing package 10 in a retail display case for customer purchase), perforations 66' are fully exposed to the atmosphere so that atmospheric oxygen can enter the package through perforations 66'. Preferably, gas-permeable film 26 is itself a gas-permeable material so that atmospheric oxygen can enter into the package through the film as well as through the perforations. In this manner, the package 10 in accordance with the present invention provides for swift ingress of atmospheric oxygen into the cavity 14 to, e.g., cause a packaged fresh red meat product to bloom in a desirably short period of time (preferably within about 45 minutes after lid 24 has been delaminated). At the same time, prior to the delamination of lid 24, perforations 66 (and 66') are enclosed by gas-impermeable film 28 and are thereby prevented from allowing the passage of gas into or out of package 10 so that the package remains substantially gas-impermeable for as long as desired.

Perforations 66 preferably range from about 5 to about 250 microns in diameter, more preferably 25 to 125 microns, and most preferably 75 to 100 microns in diameter. Ideally, the perforations are large enough to permit the passage of atmospheric gas therethrough (oxygen, nitrogen, carbon dioxide), but small enough to prevent the passage of liquids or dirt. The perforations may be formed by any suitable means, including the use of mechanical, chemical, or electrical devices. Non-limiting examples of such devices include those which perforate with laser energy, electrostatic discharge, ultrasonic waves, flame discharge, needles or other sharp objects, or combinations thereof. Preferred devices are those which produce laser energy or electrostatic discharge. An electrostatic discharge device operates by passing a film between a pair of electrodes and transmitting electricity to one of the electrodes in sufficient voltage that the electrode discharges through the film and to the other electrode, thereby perforating the film.

Having now described a preferred package in accordance with the present invention, a preferred method for making such package will be discussed. Referring generally to FIGS. 1–4, a preferred method begins with providing a product support member 12 and placing in the cavity 14 thereof a product 16, preferably a fresh red meat product such as, beef, veal, lamb, pork, venison, etc. Lid 24 is then placed over the product-containing support member and heat-welded to the flange 22 thereof as described above, thereby enclosing the product within the cavity. Lid 24 may be formed by separately placing films 26 and 28 over support member 12, e.g., from two separate film webs, and then heat-welding the films (together or separately) to the support member. Alternatively, lid 24 may be formed by first joining films 26 and 28 and then heat-welding the resultant structure to support member 12. In the latter case, the films may be joined by any suitable technique, such as corona treating one or both contacting surfaces of the films and then pressing the films together, e.g., by passing the corona-treated films through a pair of rollers; heat-treating one or both contacting surfaces of the films and then pressing the films together; applying a suitable adhesive to one or both contacting surfaces of the films and then pressing the films together; extrusion coating film 28 onto film 26 (or vise versa); using combinations of the foregoing techniques, etc.

Lid 24 is preferably supplied from a larger web of material (or two webs in the case where films 26 and 28 are applied separately to support member 12), e.g., from a roll which is unwound to supply material as needed, by placing the web (not shown) over support member 12 and severing lid 24 from the web after or simultaneously with the heat-welding of the lid to the support member. Lid 24 can be severed from the web in this manner with any conventional cutting device, e.g., a sharp cutting instrument or a thermal cutting device such as a heated wire or heated blade.

In a preferred embodiment, lid 24 is at least partially heat-shrinkable and a thermal cutting device is used to sever the lid from the supply web. The heat from the cutting device is preferably sufficient to cause the lid to shrink somewhat, thereby resulting in a tight, neat-looking lid which enhances the aesthetic qualities of the package. If desired, only gas-permeable film 26 may be heat-shrinkable since this is the only part of lid 24 that the consumer will see. In this case, when a thermal cutting device is used to sever the lid from the supply web, gas-permeable film 26 will be more taut on support member 12 than gas-impermeable film 28. However, since the gas-impermeable film is completely removed prior to placing the package in a retail display case, the consumer will only see the more tightly-drawn gas-permeable film on the package.

A packaging method in accordance with the present invention preferably includes, prior to enclosing the product within the support member, the step of at least partially evacuating the cavity of air and then at least partially filling the cavity with a gas which is lower in oxygen content than air. Any desired amount of air may be removed from the enclosure during the evacuation step, e.g., ranging from 1% to 99.999% by volume. In the case where a fresh red meat product is to be packaged, the amount of air removed preferably ranges from about 99% to about 99.999%, and more preferably from about 99.5% to about 99.999% by volume. Preferred gases to replace the evacuated air include, e.g., carbon dioxide, nitrogen, argon, etc., and mixtures of such gases. As a result of these steps, the cavity 14 of package 10 will preferably contain, prior to delamination of lid 24, less than 1% oxygen by volume, more preferably less than 0.5% oxygen, even more preferably less than 0.1% oxygen, and most preferably, less than 0.05% oxygen by volume, with the balance comprising a gas or mixture of gases, such as a mixture of carbon dioxide and nitrogen. When package 10 provides a substantially gas-impermeable enclosure, such a modified-atmosphere packaging environment ensures that a packaged fresh red meat product will have a shelf-life of at least seven days, more preferably at least ten days and, even more preferably at least fourteen days, and most preferably at least twenty one days (assuming, of course, that the package is maintained under refrigerated conditions, e.g., at temperatures ranging from about 28° F. to about 48° F.).

As mentioned above, when a fresh red meat product is maintained in a low-oxygen environment, it has a purple color which is aesthetically unappealing to most consumers. Thus, the final preferred step (or one of the final steps) in a packaging method according the present invention is to peelably remove gas-impermeable film 28 and a portion of gas-permeable film 26 from lid 24, whereby air enters cavity 14 through remaining gas-permeable film 26' and displaces at least some of the gas which is lower in oxygen content than air. In this manner, atmospheric oxygen is permitted to come into contact with the packaged fresh red meat product and cause it to bloom to a bright red color which consumers associate with freshness.

The invention may be further understood by reference to the following examples, which are provided for the purpose of representation, and are not to be construed as limiting the scope of the invention.

EXAMPLE 1

Packages were made in accordance with present invention having the following components:
   A. a support member comprising an oriented and thermoformed polystyrene foam tray including a cavity and a peripheral flange with a single upper sealing surface, the support member further including a sealant film bonded to the upper surface of the cavity and flange;
   B. a gas-permeable film heat-welded to the sealant film on the flange of the support member via a first heat-weld which extended continuously around the upper sealing surface of the flange; and
   C. a gas-impermeable film heat-welded to the gas-permeable film via a second heat-weld positioned above and coextensive with the first heat-weld.

A. The Support Member

The support member was prepared in accordance with the above-referenced U.S. Ser. No. 08/326,176, the sealant film having the following structure:

LLDPE/EVA/TIE/EVOH/TIE/EVA/SBC where:
   "LLDPE" is a layer comprising DOWLEX 2244A (™) heterogeneous ethylene/octene copolymer having a melt index of 3.3 and a density of 0.916 g/cc; obtained from The Dow Chemical Company, of Midland, Mich.
   "EVA" is a layer comprising ELVAX 3165 (™) ethylene/vinyl acetate copolymer having 18 percent by weight of vinyl acetate, a melt index of 0.7 and a density of 0.94 g/cc; obtained from E.I. Dupont de Nemours, of Wilmington, Del. (both "EVA" layers in the above film structure are the same).
   "TIE" is a layer comprising TYMOR 1203 (™) anhydride-grafted linear low density polyethylene having a melt index of 1.6 and a density of 0.910 g/cc; obtained from Morton International of Chicago, Ill. (both "TIE" layers in the above film structure are the same).
   "EVOH" is a layer comprising LC-H101BD (™) ethylene/vinyl alcohol copolymer having 38 mole percent of ethylene, a melt index of 1.5 and a melt point of 175° C.; obtained from EVAL Co. of America, of Lisle, Ill.; and
   "SBC" is a layer comprising KK36 (™) styrene/butadiene copolymer having 75 percent by weight of styrene, a melt index of 8.0 (Condition G of ASTM D-1238) and a density of 1.01 g/cc, obtained from Phillips 66, of Pasadena, Tex.

B. The Gas-Permeable Film

The gas-permeable film was prepared in accordance with U.S. patent application Ser. No. 08/531,355 (Kocher et al.), filed Sep. 20, 1995, entitled "Package with Shrink Film Lidstock", assigned to a common assignee with the present application, and incorporated by reference herein in its entirety. A counterpart to the U.S. Ser. No. 08/531,355 application has been published as European Patent Application EP 0721899 A1, published Jul. 17, 1996, and incorporated by reference herein in its entirety. The film was coextruded and biaxially oriented, had a thickness of about 1 mil, and had the following multilayer structure:

A/B/C/D/C/B/A where:
   "A" is a layer (approximately 0.27 mil) comprising a blend of
      25 wt. % of an ethylene/octene-1 copolymer with a density of 0.935 gm/cc., a melt flow index of 2.5, and an octene-1 comonomer content of 2.5%; available from Dow as Dowlex 2037™, and
      75 wt. % of an ethylene/1-octene copolymer with a density of 0.920 gm/cc, a melt flow index of 1.0, and an octene-1 content of 6.5% by weight; available from Dow as Dowlex™ 2045.
   "B" is a layer (approximately 0.09 mil) comprising anhydride-grafted polyolefin in ethylene/butene copolymer (6 wt. % butene); with a melt flow index ranging from 0.9 to 1.5 and a melting point of 127° C.; available from DuPont as Bynel™ CXA 4104.

"C" is a layer (approximately 0.09 mil) comprising a blend of
- 80 wt. % nylon 6/66 copolymer having a melting point of 196° C.; available from BASF as Ultramid™ C-35, and
- 20 wt. %. nylon 6/12 copolymer having a melting point of 130° C.; available from Emser as Grilon™ CF6S.

"D" is a layer (approximately 0.09 mil) comprising a blend of
- 90 wt. % ethylene/vinyl alcohol copolymer containing 44 mole % ethylene and having a melt flow index of 1.6 and a melting point of 165° C.; available from EVAL of America as EVALM™ LC E151A, and
- 10 wt. % nylon 6/12 copolymer having a melting point of 130° C.; available from Emser as Grilon™ CF6S.

C. The Gas-Impermeable Film

The gas-impermeable film had a thickness of about 2.5–3 mils and had the following structure:

LLDPE/EVA/EVA/ADH./BARRIER where:

"LLDPE" is a layer comprising DOWLEX 2244A (™) heterogeneous ethylene/octene copolymer having a melt index of 3.3 and a density of 0.916 g/cc; obtained from The Dow Chemical Company, of Midland, Mich.

"EVA" is a layer comprising ethylene/vinyl acetate copolymer having 3.6 percent by weight of vinyl acetate, a melt flow index of 2.0, and a density of 0.92 g/cc; obtained from the Rexene Corporation of Dallas, Tex. under the tradename PE 1375 (both "EVA" layers in the above film structure are the same).

"ADH." is an adhesive layer comprising a blend of methylene bis(phenyl isocyanate), an ethyl ester of acetic acid, and a polyol curing agent.

"BARRIER" is an oxygen barrier material comprising saran-coated (dispersion, one side) polyethylene terephthalate having a thickness of 0.56 mil; obtained from DuPont under the tradename 50M-44 Mylar™.

Several packages were formed as follows. A section of gas-permeable film large enough to completely enclose the cavity of the support member was heat-welded to the flange of the support member and then severed from a larger web of the gas-permeable film with a mechanical cutting element. Both of the foregoing steps (cutting and heat-welding) were accomplished with a Ross 3180 tray lidding machine. The machine had a heat-welding bar which applied heat (252° F.) and pressure (80 psi) to the gas-permeable film for 1.0 second to effect a heat-weld between the gas-permeable film and the sealant film around the peripheral flange of the support member. The gas-impermeable film was then heat-welded to the gas-permeable film around the peripheral flange of the support member in a similar manner, except that the heat-welding bar was heated to a temperature of 275° F. (same pressure (80 psi) and duration (1 second).

Heat-welds were formed between the gas-impermeable and gas-permeable films, as well as between the gas-permeable film and sealant film at the flange of the support member, due to the inclusion in each film of compatible polyethylene layers at each film-to-film interface. That is, layer "A" of the gas-permeable film (blend of two ethylene/alpha-olefin copolymers) formed a heat-weld with the "LLDPE" layer of the sealant film because such layers were composed of compatible materials. Similarly, the gas-impermeable film was positioned on the package such that the "LLDPE" layer thereof was in contact and formed a heat-weld with the other "A" layer of the gas-permeable film (the "BARRIER" layer of the gas-impermeable film thus defined the exterior surface of the package lid).

The resultant lid (i.e., the gas-impermeable film/gas-permeable film composite) on each of the packages was peelably delaminated. In so doing, the lid delaminated within the gas-permeable film on each of the packages leaving behind a 0.30–0.40 mil permeable film lidded to the support member. Upon closer inspection, each gas-permeable film delaminated at the C/B layer interface closest to the support member so that layers B and A (both layers comprising ethylene copolymer) remained lidded to the support member as a two-layer film having the structure B/A (with layer A in direct with the sealant film on the flange of the support member and layer B now defining the exterior surface of the package lid). The rest of the gas-permeable film, i.e, the five-layer sub-structure A/B/C/D/C, was peelably removed from each package along with the gas-impermeable film.

In each case, the lids peeled consistently at the lower C/B (polyamide/polyethylene) interface. The heat-welds formed on both sides of this interface, i.e., above and below the interface, had bond-strengths which were greater than the inter-layer adhesive strength between layers C and B. Although it is not known exactly why the lids delaminated at the lower C/B interface, as opposed to the upper C/B interface closest to the gas-impermeable film, it is theorized that the lower heat-weld (i.e., between the gas-permeable and sealant films) directed the peel force which was applied to the lids upwards and into the lower layers A and B such that those layers tore were vertically torn at the heat-weld until the tear reached the relatively weak C/B interface, at which point the tear propagated horizontally along the C/B interface and remained there until delamination was complete.

EXAMPLE 2

Packages were made in accordance with present invention having the following components:

A. a support member comprising an oriented and thermoformed polystyrene foam tray including a cavity and a peripheral flange with a single upper sealing surface, the support member further including a sealant film bonded to the upper surface of the cavity and flange;

B. a gas-permeable film heat-welded to the sealant film on the flange of the support member via a first heat-weld which extended continuously around the upper sealing surface of the flange; and C. a gas-impermeable film which was first adhesively laminated to the gas-permeable film and then, after the resultant laminate (lid) was placed on the support member, heat-welded to the gas-permeable film via a second heat-weld (or a pair of heat-welds between the adhesive and each of the films) positioned above and coextensive and simultaneously formed with the first heat-weld.

For this example, the support member (including the sealant film) and gas-impermeable film were identical to those described in Example 1. The gas-permeable film was coextruded and biaxially oriented, had a thickness of about 1 mil, and had the following five-layer structure:

A/B/C/B/A where:
"A" is a layer (approximately 0.22 mil) comprising a blend of
- 50 wt. % of an ethylene/1-octene copolymer with a density of 0.920 gm/cc, a melt flow index of 1.0, and an octene-1 content of 6.5% by weight; available from Dow as Dowlex™ 2045;
- 25 wt. % of an ethylene/octene-1 copolymer with a density of 0.935 gm/cc., a melt flow index of 2.5, and an octene-1 comonomer content of 2.5%; available from Dow as Dowlex 2037™; and
- 25 wt. % of an ethylene/vinyl acetate copolymer having 3.3 percent by weight of vinyl acetate, a melt flow index of 2.0, and a density of 0.92 g/cc; obtained from the Rexene Corporation of Dallas, Tex. under the tradename PE 1335.

"B" is a layer (approximately 0.22 mil) comprising anhydride-grafted polyolefin in ethylene/butene copolymer (6 wt. % butene); with a melt flow index ranging from 0.9 to 1.5 and a melting point of 127° C.; available from DuPont as Bynel™ CXA 4104.

"C" is a layer (approximately 0.11 mil) comprising a blend of
- 90 wt. % ethylene/vinyl alcohol copolymer (EVOH) containing 44mole % ethylene and having a melt flow index of 1.6 and a melting point of 165° C.; available from EVAL of America as EVAL™ LC E151A, and
- 10 wt. % nylon 6/12 copolymer having a melting point of 130° C.; available from Emser as Grilon™ CF6S.

A web of the gas-permeable film was microperforated via electrostatic discharge such that the film as lidded on the support member had two rows of perforations ranging from about 120 to about 500 microns in diameter and spaced about 0.75 to about 3 inches apart. The perforated gas-permeable film web was then adhesively laminated to a web of the gas-impermeable film using a urethane-based adhesive. The resultant laminate web was then placed over the support member and a section of the laminate was heat-welded completely around the flange of the support member and then severed from the web about the outer periphery of the flange with a mechanical cutting element. Both of the foregoing steps (heat-welding and cutting) were accomplished with a Ross 3180 tray lidding machine. The machine had a heat-welding bar which applied heat (255° F.) and pressure (80 psi) to the laminate (lid) for 1.0 second to simultaneously effect a heat-weld between the gas-permeable film and the sealant film around the peripheral flange of the support member, and between the gas-permeable and gas-impermeable films also around the peripheral flange of the support member. That is, layer "A" of the gas-permeable film (blend of two ethylene/alpha-olefim copolymers and ethylene/vinyl acetate) formed a heat-weld with the "LLDPE" layer of the sealant film (because such layers were composed of compatible materials). Similarly, the gas-impermeable film was positioned on the package such that the "LLDPE" layer thereof was in contact and formed a heat-weld with the other "A" layer of the gas-permeable film (because such layers were also composed of compatible materials).

The resultant lid (i.e., the gas-impermeable film/gas-permeable film composite) on each of the packages was peelably delaminated. In so doing, the lid delaminated within the gas-permeable film on each of the packages leaving behind a 0.35–0.45mil perforated, permeable film lidded to the support member. Upon closer inspection, each gas-permeable film delaminated at the C/B layer interface closest to the support member so that layers B and A (both layers comprising ethylene copolymer) remained lidded to the support member as a two-layer perforated film having the structure B/A (with layer A in direct with the sealant film on the flange of the support member and layer B now defining the exterior surface of the package lid). The rest of the gas-permeable film, i.e, the perforated three-layer substructure A/B/C, was peelably removed from each package along with the gas-impermeable film.

In each case, the lids peeled consistently at the lower C/B (EVOH/polyethylene) interface. The heat-welds formed on both sides of this interface, i.e., above and below the interface, had bond-strengths which were greater than the inter-layer adhesive strength between layers C and B. Although it is not known exactly why the lids delaminated at the lower C/B interface, as opposed to the upper C/B interface closest to the gas-impermeable film, it is theorized that the lower heat-weld (i.e., between the gas-permeable and sealant films) directed the peel force which was applied to the lids upwards and into the lower layers A and B such that those layers were vertically torn at the heat-weld until the tear reached the relatively weak C/B interface, at which point the tear propagated horizontally along the C/B interface and continued to do so until delamination was complete.

EXAMPLE 3

Packages are made in accordance with present invention having the following components:

A. a support member comprising an oriented and thermoformed polystyrene foam tray including a cavity and a peripheral flange with a single upper sealing surface, the support member further including a sealant film bonded to the upper surface of the cavity and flange;

B. a gas-permeable film heat-welded to the sealant film on the flange of the support member via a first heat-weld which extends continuously around the upper sealing surface of the flange; and C. a gas-impermeable film which is first corona laminated to the gas-permeable film and then, after the resultant laminate (lid) is placed on the support member, heat-welded to the gas-permeable film via a second heat-weld positioned above and coextensive and simultaneously formed with the first heat-weld.

For this example, the support member (including the sealant film) and gas-impermeable film are identical to those described in Example 1. The gas-permeable film is the seven-layer structure described above in Example 1 or the five-layer structure described above in Example 2. The surfaces of the gas-impermeable and gas-permeable films to be bonded to one another are first subjected to the discharge from a corona electrode and then the treated surfaces of the two films are pressed together via a pair of rollers to form a laminate which is then heat-welded to the flange of the support member. A heat-weld extends through the corona-treated interface between the gas-impermeable and gas-permeable films, and serves to further bond those films on the support member (i.e., in addition to the corona bond) to ensure preferential delamination within the gas-permeable film.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications whidh are within its spirit and scope as defined by the claims.

What is claimed is:

1. A package, comprising:
   a. a product support member having a cavity formed therein and a peripheral flange extending from said cavity, a product being disposed within said cavity;
   b. a lid enclosing the product within said cavity of said support member, said lid comprising a thermoplastic, gas-permeable film bonded to a thermoplastic, substantially gas-impermeable film, said gas-permeable film having a preselected intra-film cohesive strength;
   c. a first heat-weld which bonds said gas-permeable film to said peripheral flange of said support member; and
   d. a second heat-weld which further bonds said gas-impermeable film to said gas-permeable film and extends around said peripheral flange to define a predetermined area of contact between said gas-imnpermeable and gas-permeable films in which said films have been caused to become molten, intermixed, and then cooled, said first and second heat-welds each having a bond-strength which is greater than the intra-film cohesive strength of said gas-permeable film so that said lid preferentially delaminates within said gas-permeable film upon peeling.

2. The package of claim 1, wherein said gas-permeable film delaminates when said lid is subjected to a peel-force ranging from 0.001 to 2.5 pounds per inch.

3. The package of claim 2, wherein said gas-permeable film comprises at least two adjacent film layers which separate from one another when said lid is subjected to a peel-force ranging from 0.001 to 2.5 pounds per inch.

4. The package of claim 3, wherein
   one of said two adjacent film layers comprises polyethylene homopolymer or copolymer; and
   the other adjacent film layer comprises at least one material selected from the group consisting of polyamide, copolyamide, polyester, copolyester, polyethylene homopolymer or copolymer, and polypropylene homopolymer or copolymer.

5. The package of claim 2, wherein said gas-permeable film comprises at least one layer which internally separates when said lid is subjected to a peel-force ranging from 0.001 to 2.5 pounds per inch.

6. The package of claim 1, wherein said lid is at least partially heat-shrinkable.

7. The package of claim 1, wherein said gas-permeable film is perforated.

8. The package of claim 1, wherein said support member includes a peripheral flange extending outwardly from said cavity, said gas-permeable film of said lid being bonded to an upper surface of said flange via said first heat-weld, said first heat-weld extending continuously around said upper flange surface.

9. The package of claim 8, wherein said support member includes a sealant film having an upper principal surface and a lower principal surface, and wherein
   the lower principal surface of said sealant film is bonded to said cavity and to said upper flange surface of said support member;
   the upper principal surface of said sealant film defines an uppermost surface of said support member in contact with the product in said cavity and in contact with said gas-permeable film of said lid on said upper flange surface; and
   said gas-permeable film of said lid is bonded, via said first heat-weld, to said upper principal surface of said sealant film at said upper flange surface.

10. The package of claim 9, wherein gas-permeable and sealant films define an interface therebetween, each of said films comprising at least one material at said interface which is capable of forming a heat-weld with the other material.

11. The package of claim 9, wherein said sealant film is substantially gas-impermeable.

12. The package of claim 1, wherein said support member and lid form a substantially gas-impermeable enclosure for the product.

13. A packaging method, comprising:
   a. providing a product support member having a cavity formed therein and a peripheral flange extending from said cavity;
   b. placing a product in said cavity;
   c. providing a lid comprising a thermoplastic, gas-permeable film bonded to a thermoplastic, substantially gas-impermeable film, said gas-permeable film having a preselected intra-film cohesive strength; and
   d. placing said lid over said support member and applying sufficient heat and pressure to said lid to enclose the product within said cavity of said support member by forming
      a first heat-weld which bonds said gas-permeable film to said peripheral flange of said support member, and
      a second heat-weld which further bonds said gas-impermeable film to said gas-permeable film and extends around said peripheral flange to define a predetermined area of contact between said gas-impermeable and gas-permeable films in which said films have been caused to become molten, intermixed, and then cooled,
   said first and second heat-welds each having a bond-strength which is greater than the intra-film cohesive strength of said gas-permeable film so that said lid preferentially delaminates within said gas-permeable film upon peeling.

14. The method of claim 13, further including, prior to enclosing the product within said support member, the step of at least partially evacuating said cavity of air and then at least partially filling said cavity with a gas which is lower in oxygen content than air.

15. The method of claim 14, further including, after the product has been enclosed within said support member, the step of modifying the gaseous conditions under which the product is packaged by peeling said gas-impermeable film and a portion of said gas-permeable film from said lid, whereby air enters said cavity through the remainder of said gas-permeable film and displaces at least some of said gas which is lower in oxygen content than air.

16. The method of claim 13, wherein said gas-permeable film delaminates when said lid is subjected to a peel-force ranging from 0.001 to 2.5 pounds per inch.

17. The method of claim 16, wherein said gas-permeable film comprises at least two adjacent film layers which separate from one another when said lid is subjected to a peel-force ranging from 0.001 to 2.5 pounds per inch.

18. The method of claim 17, wherein
   one of said two adjacent film layers comprises polyethylene homopolymer or copolymer; and
   the other adjacent film layer comprises at least one material selected from the group consisting of polyamide, copolyamide, polyester, copolyester, polyethylene homopolymer or copolymer, and polypropylene homopolymer or copolymer.

19. The method of claim 16, wherein said gas-permeable film comprises at least one layer which internally separates when said lid is subjected to a peel-force ranging from 0.001 to 2.5 pounds per inch.

20. The method of claim 13, wherein said gas-permeable film is perforated.

21. The method of claim 13, wherein said support member includes a peripheral flange extending outwardly from said cavity, said gas-permeable film of said lid being bonded to an upper surface of said flange via said first heat-weld, said first heat-weld extending continuously around said upper flange surface.

22. The method of claim 21, wherein said support member includes a sealant film having an upper principal surface and a lower principal surface, and wherein the lower principal surface is bonded to said cavity and to said upper flange surface of said support member;

the upper principal surface defines an uppermost surface of said support member in contact with the product in said cavity and with said gas-permeable film of said lid on said upper flange surface; and said gas-permeable film of said lid is bonded, via said first heat-weld, to said upper principal surface of said sealant film at said upper flange surface.

23. The package of claim 22, wherein gas-permeable and sealant films define an interface therebetween, each of said films comprising at least one material at said interface which is capable of forming a heat-weld with the other material.

24. The method of claim 22, wherein said sealant film is substantially gas-impermeable.

25. The method of claim 13, wherein said support member and lid form a substantially gas-impermeable enclosure for the product.

* * * * *